(12) United States Patent
Petrini et al.

(10) Patent No.: US 7,566,680 B2
(45) Date of Patent: Jul. 28, 2009

(54) HIGH SURFACE AREA IRON MATERIAL PREPARED FROM A LOW SURFACE AREA IRON METAL PRECURSOR

(75) Inventors: Guido Petrini, Galliate (IT); Esterino Conca, Novara (IT); Robert J. O'Brien, Louisville, KY (US); X.D. Hu, Louisville, KY (US); Samantha Sargent, Borden, IN (US)

(73) Assignee: Sud-Chemie Inc., Louisville, KY (US)

( * ) Notice: Subject to any disclaimer, the term of this patent is extended or adjusted under 35 U.S.C. 154(b) by 647 days.

(21) Appl. No.: 11/254,463

(22) Filed: Oct. 20, 2005

(65) Prior Publication Data

US 2006/0101944 A1 May 18, 2006

Related U.S. Application Data

(63) Continuation-in-part of application No. 10/343,935, filed on May 29, 2003, now Pat. No. 7,199,077, and a continuation-in-part of application No. PCT/US02/15310, filed on May 15, 2002.

(60) Provisional application No. 60/684,462, filed on May 25, 2005.

(51) Int. Cl.
  B01J 23/70 (2006.01)
  B01J 23/00 (2006.01)
  B01J 37/00 (2006.01)
  B01J 31/00 (2006.01)
  C08F 4/00 (2006.01)

(52) U.S. Cl. .................. 502/338; 502/104; 502/105; 502/110; 502/113; 502/326

(58) Field of Classification Search .............. 502/104, 502/105, 110, 113, 325, 326, 328, 330, 331, 502/338
See application file for complete search history.

(56) References Cited

U.S. PATENT DOCUMENTS

| | | | |
|---|---|---|---|
| 3,657,155 A * | 4/1972 | Yoshino et al. ............. 502/249 |
| 3,748,119 A * | 7/1973 | Hwang et al. ................. 75/349 |
| 3,892,897 A | 7/1975 | Rittler |
| 3,965,046 A * | 6/1976 | Deffeyes ..................... 502/337 |
| 4,343,724 A | 8/1982 | Antos |
| 4,414,133 A | 11/1983 | Otake et al. |
| 4,478,954 A | 10/1984 | Connolly et al. |
| 4,499,204 A | 2/1985 | Vanderspurt et al. |
| 4,568,662 A * | 2/1986 | Bialy et al. ................. 502/257 |
| 4,598,062 A | 7/1986 | Schneider et al. |
| 4,666,882 A * | 5/1987 | Okazaki et al. ............. 502/338 |
| 4,677,084 A * | 6/1987 | Bergna .......................... 502/8 |
| 4,861,745 A | 8/1989 | Huang et al. |
| 5,059,573 A * | 10/1991 | Sasaki et al. ................. 502/205 |
| 5,536,693 A * | 7/1996 | Lemanski et al. ........... 502/300 |
| 5,580,839 A * | 12/1996 | Huffman et al. ............. 502/338 |
| 5,665,667 A * | 9/1997 | Lemanski et al. ........... 502/300 |
| 5,783,726 A * | 7/1998 | Lemanski et al. ........... 560/261 |
| 5,863,856 A | 1/1999 | Mauldin |
| 6,013,599 A * | 1/2000 | Manson ..................... 502/340 |
| 6,100,215 A * | 8/2000 | Sasaki et al. ................. 502/201 |
| 6,183,658 B1 | 2/2001 | Lesniak et al. |
| 6,265,451 B1 | 7/2001 | Zhou et al. |
| 6,790,274 B2 | 9/2004 | Conca et al. |
| 7,199,077 B2 | 4/2007 | Hu et al. |
| 2004/0009871 A1 | 1/2004 | Hu et al. |
| 2004/0202606 A1 | 10/2004 | Conca et al. |

FOREIGN PATENT DOCUMENTS

| | | |
|---|---|---|
| GB | 287702 A | 3/1928 |
| GB | 1226876 A | 3/1971 |

OTHER PUBLICATIONS

Newsome, David "The Water-Gas Shift Reaction" Catal. Rev.-Sce. Eng., 21(2) p. 275-318 (1980).

\* cited by examiner

*Primary Examiner*—Cam N. Nguyen

(57) ABSTRACT

A method for producing a high surface area iron material starting with a low surface area iron metal is disclosed. The iron material of the present invention has a surface area of at least about 200 $m^2/g$, and is prepared via a method which comprises reacting a low surface area iron metal with oxygen and an organic acid. The high surface area iron material formed via this method is essentially free of contaminants.

26 Claims, No Drawings

HIGH SURFACE AREA IRON MATERIAL PREPARED FROM A LOW SURFACE AREA IRON METAL PRECURSOR

CROSS REFERENCE TO RELATED APPLICATIONS

This application claims priority to U.S. Patent Application 60/684,462 filed on May 25, 2005, and is a continuation in part of PCT Patent Application Serial Number PCT/US02/15310 filed on May 15, 2002, currently pending, and of U.S. patent application Ser. No. 10/343,935 filed on May 29, 2003 now U.S. Pat. No. 7,199,077, these applications being incorporated herein in their entirety by reference.

BACKGROUND

The present invention is for a method for producing a high surface area iron material starting with a low surface area iron metal. The iron material of the present invention has a surface area of at least about 200 m$^2$/g, and is prepared via a method which comprises reacting a low surface area iron metal with oxygen and an organic acid. The high surface area iron material formed via this method is essentially free of contaminants.

Iron-based catalysts are known in the art for use in a variety of chemical reactions. For example, in water gas shift reactions it is common practice to employ chromium-promoted iron catalysts in a high temperature first stage (referred to as a high temperature shift or HTS reaction) to effect carbon monoxide conversion at temperatures above about 350° C. and to reduce the CO content to about 3%-4% (see, for example, D. S. Newsom, Catal. Rev., 21, p. 275 (1980)). A typical composition of high temperature shift (HTS) catalyst comprises from about 60 wt % to about 95 wt % Fe$_2$O$_3$, from about 0 wt % to about 20 wt % Cr$_2$O$_3$, from about 0 wt % to about 10 wt % of CuO and from about 0 wt % to about 10 wt % other active components such as ZrO$_2$, TiO$_2$, CO$_3$O$_4$, Al$_2$O$_3$, SiO$_2$ and/or CeO$_2$.

Since the 1950's iron-based Fischer-Tropsch catalysts have been successfully used in fixed-bed, fluidized-bed and slurry phase reactors, and there have been several methods used for the preparation of iron-based Fischer-Tropsch catalysts. The earliest catalysts, prepared by Fischer, were iron turnings treated with alkali. At high pressure, the liquid product was rich in oxygenated compounds, and at lower pressures hydrocarbons were produced. However, the iron-based catalysts prepared by this method deactivated rapidly.

The most common method of preparation of iron-based Fischer-Tropsch catalysts is precipitation. Typically a solution of an iron salt, such as ferric nitrate, is treated with a base, such as aqueous ammonia or sodium carbonate. The resulting iron oxyhydroxide precipitate is washed and filtered repeatedly to remove salts—ammonium nitrate or sodium nitrate—formed during the precipitation process. The washed filter cake is then dried and calcined. Promotion of the precipitated iron catalyst with copper and a Group I metal can be done at any time, before or after the drying and calcination steps. The final catalyst precursor is usually composed of high surface area corundum phase iron oxide ($\alpha$-Fe$_2$O$_3$ or hematite).

Other types of iron based catalysts include, fused iron, supported iron and sintered iron. Fused iron catalysts are prepared by melting iron ore and one or more promoter such as SiO$_2$, Al$_2$O$_3$, CaO, MgO and K$_2$O. The resulting catalyst precursor is usually composed predominantly of magnetite (Fe$_3$O$_4$) and has very low surface area. Active fused iron catalysts can only be achieved by reduction of the oxide to metallic iron with hydrogen. The reduced catalyst can have surface area up to about 10 to 15 m$^2$/g. Fused iron catalysts are characterized by high structural integrity and as such are well suited for fluid bed operations; however, the relatively low surface area results in a Fischer-Tropsch catalyst with inferior activity as compared to typical precipitated iron catalysts. Supported iron catalysts are usually prepared by impregnating a solution of an iron salt onto a refractory metal oxide such as Al$_2$O$_3$, SiO$_2$, TiO$_2$ or ZrO$_2$. The impregnation can be carried out by incipient wetness techniques or by excess wetting followed by vacuum drying. Supported iron catalysts can have Fischer-Tropsch activity similar to precipitated iron catalysts on an iron mass basis; however, they are typically inferior on a catalyst volume basis. Supported iron catalysts inevitably suffer from the acidity of the metal oxide supports which increases the selectivity of undesirable methane.

Precipitated iron catalysts are generally regarded as superior Fischer-Tropsch catalysts to the other types of iron catalysts described herein. The major disadvantages of the manufacture of precipitated iron catalysts include high cost, the method is labor intensive, and the by-products are deleterious to the environment. Iron nitrate is the preferred iron source of precipitated iron catalysts because chloride and sulfur contamination from iron chloride or iron sulfate would have a deleterious affect on the activity of the resulting F-T catalyst. Iron nitrate is manufactured by the digestion of iron metal in nitric acid which produces nitrogen oxides that must be recovered by a scrubbing process. This necessary scrubbing step adds additional cost to the process.

A process to produce iron-based Fischer-Tropsch catalysts that reduces or eliminates the washing and filtration steps and has minimal emissions to the environment would be favorable. A logical process from a commercial viewpoint would be to promote, form, dry and calcine a commercially available iron oxide that has high purity and high surface area. Commercial iron oxides are readily available; however, they are usually prepared by treatment of steel with hydrochloric acid or sulfuric acid. These iron oxides contain significant amounts of impurities including chloride and sulfur which makes them unusable as raw materials for Fischer-Tropsch catalysts. As is known in the art, the impurities of the commercial iron oxides (red or yellow iron oxides) can be reduced to a very low level by the pickling process under very high temperatures. However, because of the extreme conditions of the pickling process, the surface area of the iron oxide is generally less than 10 m$^2$/g making the iron oxide unsuitable for some catalyst applications, for example, low temperature Fischer-Tropsch reaction.

Alternatively, a low contaminant iron oxide material may be used, such as the iron oxide taught in U.S. Pat. No. 6,790,274 (issued to Conca et al. on Sep. 14, 2004, and assigned to Süd-Chemie MT), U.S. Patent Application 20040009871 (inventors Hu et al., published on Jan. 15, 2004) and U.S. Patent Application 20040202606 (inventors Conca et al, published on Oct. 14, 2004), all three documents being incorporated in their entirety by reference. However, the iron oxides produced by the process taught in the '274 patent, the '871 application and the '606 application have surface areas of less than about 150 m$^2$/g.

SUMMARY OF THE PRESENT INVENTION

A high surface area iron material is prepared from a low surface area iron metal. The iron material of the present invention has a surface area of at least about 200 m$^2$/g, and is essentially free of contaminants. The method for preparation of the iron material comprises reacting iron metal with a mild organic acid and oxygen. In a preferred embodiment, the reaction temperature is maintained at from about 0° C. to about 40° C. in the reaction tank with a condenser temperature of from about 0° C. to about 5° C. The reaction solution is well-agitated, and optionally, a defoaming agent may be added. The resulting iron oxide slurry is then filtered, reslurried and refiltered. The resultant filter cake is dried to form the high surface area iron material. Because the process uses iron metal, the level of potential contaminants, such as sulfur and chlorine, can be kept to a minimum by starting with clean metal. Further, by starting with iron metal, there are no residual materials which need to be removed by washing the iron oxide filtrate.

DETAILED DESCRIPTION OF THE PREFERRED EMBODIMENTS

The high surface area iron material of the present invention is intended for use in any iron-based catalyst requiring a high surface area. The iron material differs from the iron oxides of the prior art by having a surface area of at least about 200 $m^2/g$. Further, the process by which the iron material is prepared is novel and produces an iron material that is essentially free of contaminants, and which has a relatively narrow particle size distribution range, and a high surface area, and which can be produced more efficiently than iron oxide materials of the prior art.

Broadly presented, the process for preparing a preferred embodiment of the iron material of the present invention includes directly treating iron metal with a mild organic acid and oxygen while vigorously agitating the mixture to form a slurry consisting of iron oxyhydroxide, iron hydroxide, iron oxide hydrate, or the other amorphous or poorly ordered iron phases, then filtering the slurry to produce a filter cake, then reslurrying the filter cake and refiltering the slurry, and then drying the filter cake. More specifically, to prepare the iron material of the present invention, water is added to a temperature-controlled reaction vessel fitted with a condenser and chiller, and having a means for mixing or similarly agitating the contents of the vessel. The reaction vessel is held at a temperature of from about 0° C. to about 40° C. and is fitted with a condenser held at from about 0° C. to about 5° C. Iron metal is added to the reaction vessel and the vessel is purged with an inert gas. As the iron and water are agitated and while maintaining the inert atmosphere, an organic acid is added to the vessel. After the acid/iron combination is mixed for a predetermined period of time under the inert atmosphere, oxygen is added to the reaction vessel with vigorous agitation. Optionally, a defoaming agent may further be added to the vessel as needed either at the beginning of the oxidation step or during the oxidation step. After a predetermined amount of oxygen has been added to the reaction vessel, the resultant slurry is filtered. The slurry filter cake is then added to water, reslurried and the slurry is filtered. The filter cake is then dried to produce the high surface area iron material.

The iron metal may be a powder, granule, sphere, chip, shard, needle or other form of iron metal, and has a surface area of less than about 25 $m^2/g$, and is essentially free of contaminants. As described herein, the iron metal has an average diameter of from about 1µ to about 500µ. (As used herein, the term micron (µ) means a metric distance equal to one millionth of a meter and is used interchangeably with micrometer.) However, iron metal with a larger average diameter may be used, but the reaction time may need to be altered (increased) to ensure that the iron metal has adequate time to react. In one embodiment, the iron metal is in micro-spheroidal form with an average diameter of from about 40µ to about 150µ. Further, the iron metal should be essentially contaminant-free, although traces of carbon, manganese, nickel, copper, silicon and combinations thereof, may be present. (As used herein, "traces" is defined as less than about 1.5 wt % for all the elements combined.)

The organic acid is preferably a carboxylic acid having at least one carboxylic acid group with a $pK_a$ at ambient temperature of from about 0.5 to about 6. (As used herein, the term "ambient" refers to average room temperature or to a temperature of from about 18° C. to about 22° C.) For example, formic acid, acetic acid, glycolic acid, oxalic acid, pyruvic acid, malonic acid and propionic acid may be used in the reaction. In a preferred embodiment, the organic acid is glacial acetic acid. The acid to iron ratio may vary. In the present invention, the acid to iron mole ratio is preferably between about 0.1 acid per 1 iron to about 2.5 acid per 1 iron.

The inert gas can be any non-reactive material known in the art, such as nitrogen gas or argon gas. Normally, nitrogen gas is used commercially because of its relatively low cost.

The defoaming agent can be any organic or silicone based defoaming agents, such as oils, oily alcohols, alcohols, esters, ethers, glycols, polysiloxanes, dimethylpolysiloxane, $C_8$ to $C_{12}$ alcohols and a combination thereof. In a preferred embodiment, a long chain oxygenated hydrocarbon, such as octanol, decanol and polyethylene glycols and a combination thereof can be used.

The oxidizing agent is preferably oxygen which is forced through the solution via the hollow shaft of the mixer such that the oxygen flows through the shaft and is discharged underneath the impeller, or via a stainless steel sparger mounted within a mix tank, however, a variety of other means as are known in the art may be used to bubble oxygen through the acid/iron combination. The oxygen must be well dispersed throughout the entire volume of the solution in order to produce the desired high surface area iron material. In a preferred embodiment, the mixer is equipped with multiple impellers for gas dispersion and solid mixing, including a radial flow gas dispersion impeller and an axial flow solid mixing impeller. The oxygen flow is continued and the reaction temperature is held at less than about 40° C. until essentially all the free iron is consumed and an iron material slurry is formed. The slurry is believed to comprise iron oxide hydrate, iron oxide, iron hydroxide, iron oxyhydroxide, amorphous or poorly ordered phases in a general formula of $Fe_xO_y(OH)_z$ and a combination thereof. Total iron consumption time can range from about 18 hours to about 24 hours, or longer depending on the iron source. During the course of the reaction, the slurry color changes from gray to brown. Typically, the color change will be evident from about 45 minutes to about 6 hours after the oxygen flow is started. Unreacted iron can be detected by X-ray diffraction patterns.

The following example illustrates and explains the present invention, but is not to be taken as limiting the present invention in any regard.

EXAMPLE 1

A sample of high surface area iron material is prepared by the inventive method presented herein as follows: A stainless steel air sparger is fitted into the bottom of a 3 liter jacketed vessel and the temperature is adjusted to hold at about 30° C. About 700 mL of deionized water is added to the vessel and agitation is started at a mix rate of about 600 RPM. About 93.3 g of iron powder (commercially available from Hoeganaes and designated by product code ATW-432, and having an iron metal surface area of about 0.2 $m^2/g$) is added to the water with mixing. The iron powder is added slowly enough to maintain a reaction temperature of less than about 30° C. A nitrogen purge is started at a rate of about 35 liters per hour. About 50.4 g of glacial acetic acid (commercially available from Fisher Chemicals) is added to the iron and water mixture with a continuing nitrogen purge. After about a four hour nitrogen purge, the nitrogen is replaced by a pure oxygen gas flow at a rate of about 50 liters per hour and is maintained for about 20 hours. As needed during the oxygen addition, 0.7 g 1-octanol (commercially available through Sigma Chemicals) and/or 0.75 g 1-octanol plus 0.35 g 1-decanol (commercially available through Sigma Chemicals) is added to the vessel to reduce foaming. The iron material slurry is then filtered over no. 42 filter paper. The filter cake is then reslurried with about 3000 mL of deionized water and the mixture is filtered a second time. The filter cake is then dried for about 16 hours at about 120° C. The single point surface area (out-gassed at 150° C. for about 1.5 hours) is about 200 m²/g.

EXAMPLE 2

A sample of high surface area iron material is prepared by the inventive method presented herein as follows: A 0.9 liter jacketed vessel, equipped with a hollow shaft stirrer and three vertical stainless steel buffles, about 113 mm long, about 16 mm wide and about 2 mm thick is used. The temperature is adjusted to hold at about 30° C., about 300 mL of deionized water is added to the vessel and agitation is started at a mix rate of about 450 RPM. About 40 g of iron powder (commercially available from POMETON and designated by product FERCHIM RI 63/3.2, and having an iron metal surface area of about 0.1 m²/g) is added to the water with mixing. The iron powder is added slowly enough to maintain a reaction temperature of less than about 30° C. A nitrogen purge is started at a rate of about 25 liters per hour. About 11.7 g of glacial acetic acid (commercially available from Riedel de Haën-Germany) is added to the iron and water mixture with a continuing nitrogen purge. After about a four hour nitrogen purge, the nitrogen is replaced by a pure oxygen gas flow at a rate of about 25 liters per hour and is maintained for about 20 hours. The gas flow was supplied on the top of the reactor. The iron material slurry is then filtered over no. 42 filter paper. The filter cake is then reslurried with about 300 mL of deionized water and the mixture is filtered a second time. The filter cake is then dried for about 16 hours at about 140° C. The single point surface area (out-gassed at 110° C. for about 1.5 hours) is about 290 m²/g.

The iron material of the present invention is intended for use in any catalyst requiring a high surface area iron. The process by which the material is prepared produces a finished product essentially free from contaminants, and having a relatively small particle size distribution range, and a high surface area. It is understood that the specific processing conditions may be varied without exceeding the scope of this development.

We therefore claim:

1. A method of making a high surface area, high purity iron material, said method comprising:
   a) adding iron metal to water in a temperature-controlled vessel while maintaining an inert gas purge and agitation;
   b) combining said iron metal with an aqueous organic acid solution;
   c) stopping said inert gas purge and forcing an oxidative agent through said acid solution until said iron metal is consumed and an iron material slurry is formed;
   d) filtering said iron material slurry and retaining a first filter cake;
   e) adding said first filter cake to water to form a second iron material slurry;
   f) filtering said second iron material slurry and retaining a second filter cake; and
   g) air drying said second filter cake to produce a high surface area, high purity iron material having a surface area of at least 200 m²/g.

2. The method of claim 1 wherein said iron metal is selected from the group consisting of a powder, granule, sphere, chip, shard, needle and iron metal of other configurations.

3. The method of claim 1 wherein said oxidizing agent is delivered to said acid solution via a hollow shaft mixer in which oxygen flows through a shaft and is discharged underneath an impeller.

4. The method of claim 1 wherein said organic acid is a carboxylic acid having at least one carboxylic acid group with a $pK_a$ at ambient temperature of from about 0.5 to about 6.

5. The method of claim 1 wherein said oxidizing agent is oxygen.

6. The method of claim 1 further including the addition of a defoaming agent concurrent with the addition of said oxidizing agent.

7. A method of making a high surface area iron material, said method comprising:
   a) adding water to a temperature-controlled reaction vessel fitted with a condenser and chiller, and having a means for agitating the contents of the vessel;
   b) adding iron metal having an average diameter of from about 1μ to about 500μ and a surface area of less than 25 m²/g to said vessel with agitation;
   c) purging said vessel with an inert gas while maintaining agitation;
   d) forming an organic acid/iron combination by adding a carboxylic acid having at least one carboxylic acid group with a $pK_a$ of from about 0.5 to about 6 to said vessel with continued agitation and while maintaining the inert atmosphere;
   e) agitating said organic acid/iron combination for a predetermined period of time under the inert atmosphere;
   f) stopping said inert gas purge and forcing an oxidizing agent through said acid solution until said iron metal is consumed and an iron material slurry is formed, wherein said oxidizing agent is delivered to said acid solution via a hollow shaft mixer in which oxygen flows through a shaft and is discharged underneath an impeller;
   g) filtering said iron material slurry and retaining a first filter cake;
   h) adding said first filter cake to water to form a second iron material slurry;
   i) filtering said second iron material slurry and retaining a second filter cake; and
   j) air drying said second filter cake to produce a high surface area iron material.

8. The method of claim 7 wherein said organic acid is selected from the group consisting of formic acid, acetic acid, glycolic acid, oxalic acid, pyruvic acid, malonic acid and propionic acid, and combinations thereof.

9. The method of claim 7 wherein said oxidizing agent is oxygen.

10. The method of claim 7 further including the addition of a defoaming agent concurrent with the addition of said oxidizing agent.

11. A method of making a high surface area iron material, said method comprising:

a) adding water to a temperature-controlled reaction vessel fitted with a condenser and chiller, and having a means for agitating the contents of the vessel;
b) adding iron metal to said vessel with agitation;
c) purging said vessel with an inert gas while maintaining agitation;
d) forming an organic acid/iron combination by adding an aqueous organic acid to said vessel with continued agitation and while maintaining the inert atmosphere;
e) agitating said organic acid/iron combination for a predetermined period of time under the inert atmosphere;
f) stopping said inert gas purge and forcing an oxidizing agent through said acid solution until said iron metal is consumed and an iron material slurry is formed;
g) filtering said iron material slurry and retaining a first filter cake;
h) adding said first filter cake to water to form a second iron material slurry;
i) filtering said second iron material slurry and retaining a second filter cake; and
j) air drying said second filter cake to produce a high surface area iron material.

12. The method of claim 11 wherein the vessel is held at a temperature of less than about 40° C. fitted with a condenser held at about 5° C.

13. The method of claim 11 wherein said iron metal is selected from the group consisting of a powder, granule, sphere, chip, shard, needle and iron metal of other configurations.

14. The method of claim 13 wherein said iron metal has an average diameter of from about 1µ to about 500µ.

15. The method of claim 11 wherein said oxidizing agent is delivered to said acid solution via a hollow shaft mixer in which oxygen flows through a shaft and is discharged underneath an impeller.

16. The method of claim 11 wherein said means for agitating the contents of the vessel are multiple impellers for gas dispersion and solid mixing.

17. The method of claim 16 wherein said multiple impellers consists of a radial flow impeller and an axial flow impeller.

18. The method of claim 11 wherein said inert gas is nitrogen.

19. The method of claim 11 wherein said organic acid is a carboxylic acid having at least one carboxylic acid group with a $pK_a$ at ambient temperature of from about 0.5 to about 6.

20. The method of claim 11 wherein said organic acid is selected from the group consisting of formic acid, acetic acid, glycolic acid, oxalic acid, pyruvic acid, malonic acid and propionic acid, and combinations thereof.

21. The method of claim 11 wherein said organic acid is glacial acetic acid.

22. The method of claim 11 wherein the mole ratio of acid to iron ranges from 0.1 acid:1 iron to 2.5 acid:1 iron.

23. The method of claim 11 wherein said oxidizing agent is oxygen.

24. The method of claim 11 further including the addition of a defoaming agent concurrent with the addition of said oxidizing agent.

25. The method of claim 24 wherein said defoaming agent is selected from the group consisting of an organic defoaming agent, a silicone based defoaming agent, an oil, an oily alcohol, an alcohol, an ester, an ether, a glycol, a polysiloxane, a dimethylpolysiloxane, a $C_8$ to $C_{12}$ alcohol, and combinations thereof.

26. The method of claim 25 wherein said defoaming agent is polyethylene glycol, octanol, decanol or combinations thereof.

* * * * *